(12) United States Patent
Heilbron et al.

(10) Patent No.: US 10,524,021 B2
(45) Date of Patent: Dec. 31, 2019

(54) METHOD AND SYSTEM FOR RETRIEVING ONLINE CONTENT IN AN INTERACTIVE TELEVISION ENVIRONMENT

(76) Inventors: Maarten Boudewijn Heilbron, Toronto (CA); Peter Werner Ratsch, Toronto (CA); Sean MacLean Murray, Ottawa (CA); Jeffrey Clarke, Toronto (CA)

( * ) Notice: Subject to any disclaimer, the term of this patent is extended or adjusted under 35 U.S.C. 154(b) by 460 days.

(21) Appl. No.: 12/643,506

(22) Filed: Dec. 21, 2009

(65) Prior Publication Data

US 2010/0162312 A1 Jun. 24, 2010

Related U.S. Application Data

(63) Continuation-in-part of application No. PCT/CA2008/002242, filed on Dec. 22, 2008.

(60) Provisional application No. 61/140,440, filed on Dec. 23, 2008.

(51) Int. Cl.
*H04N 21/8405* (2011.01)
*H04N 21/231* (2011.01)
*H04N 21/433* (2011.01)
*H04N 7/173* (2011.01)
*H04N 21/482* (2011.01)
*H04N 21/61* (2011.01)
*H04N 21/258* (2011.01)
*H04N 21/431* (2011.01)
*H04N 21/472* (2011.01)
*G06F 16/957* (2019.01)

(52) U.S. Cl.
CPC ..... *H04N 21/8405* (2013.01); *G06F 16/9577* (2019.01); *H04N 7/17336* (2013.01); *H04N 21/23109* (2013.01); *H04N 21/25883* (2013.01); *H04N 21/25891* (2013.01); *H04N 21/4316* (2013.01); *H04N 21/4332* (2013.01); *H04N 21/47202* (2013.01); *H04N 21/4828* (2013.01); *H04N 21/6125* (2013.01)

(58) Field of Classification Search
CPC ......... H04N 21/4332; H04N 21/23109; H04N 21/8405; H04N 7/17336; H04N 21/25883; H04N 21/25891; H04N 21/4316; G06F 17/30002; G06F 16/9577
USPC .................................. 725/43, 53, 39, 45
See application file for complete search history.

(56) References Cited

U.S. PATENT DOCUMENTS 6,240,555 B1 * 5/2001 Shoff et al. ................... 725/110
7,693,992 B2 * 4/2010 Watson ......................... 709/226
8,213,426 B2 * 7/2012 Zampiello ........... H04L 12/1859
370/390

(Continued)

OTHER PUBLICATIONS

International Search Report dated Sep. 11, 2009 in connection with International Patent Application No. PCT/CA2008/002242.

(Continued)

*Primary Examiner* — James R Sheleheda
*Assistant Examiner* — Franklin S Andramuno
(74) *Attorney, Agent, or Firm* — Pearne & Gordon LLP

(57) ABSTRACT

Method for retrieving online content in an interactive environment. The method is executable by a computing device. The method comprises obtaining a plurality of descriptive information elements; parsing at least some of the descriptive information elements into one or more subsets of information elements associated with respective information categories; retrieving online content for each of the one or more subsets of information elements; and causing the retrieved online content to be presented to a user.

38 Claims, 8 Drawing Sheets

(56) References Cited

U.S. PATENT DOCUMENTS

| | | | |
|---|---|---|---|
| 8,484,192 B1* | 7/2013 | Sahami et al. ................ 707/708 |
| 2001/0005903 A1* | 6/2001 | Goldschmidt Iki et al. ... 725/50 |
| 2002/0143624 A1* | 10/2002 | Catan .............................. 705/14 |
| 2002/0143971 A1* | 10/2002 | Govindarajan et al. ...... 709/230 |
| 2003/0177503 A1* | 9/2003 | Sull ................... G06F 17/30796 725/112 |
| 2003/0208756 A1* | 11/2003 | Macrae et al. .................. 725/34 |
| 2004/0187164 A1* | 9/2004 | Kandasamy et al. ......... 725/132 |
| 2005/0015803 A1 | 1/2005 | Macrae et al. |
| 2007/0214480 A1* | 9/2007 | Kamen ........................... 725/53 |
| 2007/0271586 A1 | 11/2007 | Alperin |
| 2008/0022211 A1* | 1/2008 | Jones ....................... G09B 5/06 715/739 |
| 2008/0208961 A1* | 8/2008 | Kim et al. .................... 709/203 |
| 2009/0006368 A1* | 1/2009 | Mei ................... G06F 17/30796 |
| 2009/0013354 A1* | 1/2009 | Choi et al. ...................... 725/51 |
| 2009/0067602 A1* | 3/2009 | Rudolph ............. H04M 3/4931 379/202.01 |

OTHER PUBLICATIONS

Written Opinion of the International Searching Authority dated Sep. 11, 2009 in connection with International Patent Application No. PCT/CA2008/002242.

\* cited by examiner

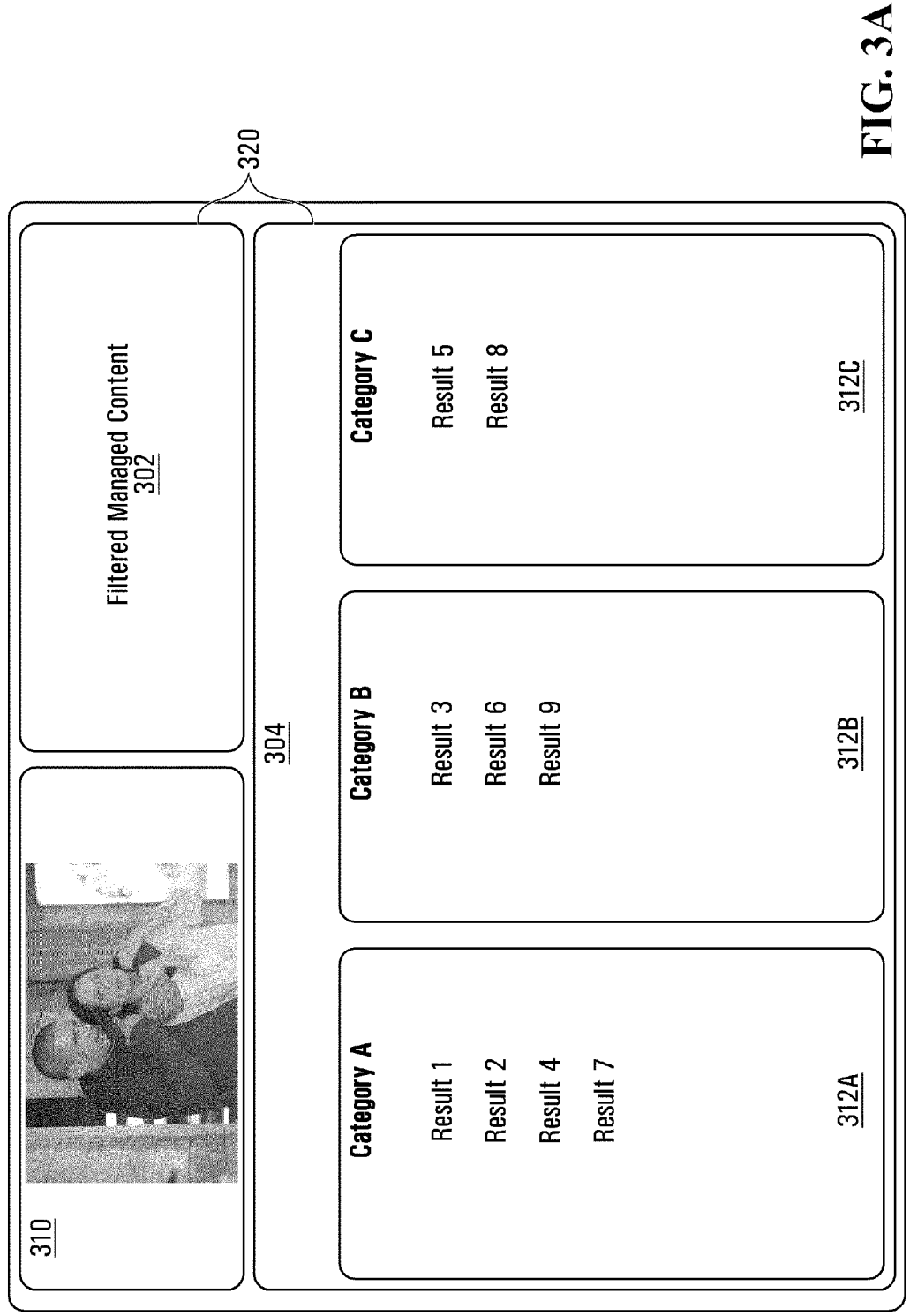

320

Result 1 — A
Result 2 — A
Result 3 — B
Result 4 — A
Result 5 — C
Result 6 — B
Result 7 — A
Result 8 — C
Result 9 — B Category Mnemonic/Icon 332

FIG. 3C

METHOD AND SYSTEM FOR RETRIEVING ONLINE CONTENT IN AN INTERACTIVE TELEVISION ENVIRONMENT

CROSS-REFERENCE TO RELATED APPLICATIONS

The present application is a continuation-in-part (CIP) of PCT International Application Serial No. PCT/CA2008/002242 to BCE Inc. et al., filed on Dec. 22, 2008, designating the United States, hereby incorporated by reference herein. Benefit is claimed under 35 USC § 120.

The present application also claims the benefit under 35 USC § 119(e) of U.S. Provisional Patent Application Ser. No. 61/140,440 to Ratsch et al., filed on Dec. 23, 2008, hereby incorporated by reference herein.

FIELD OF THE INVENTION

The present invention relates to an interactive television environment and, in particular, to a method and system for retrieving online content in such an environment.

BACKGROUND

The technology around television has changed greatly since inception of this medium. The original paradigm of broadcasting an analog signal over a radio frequency carrier has evolved into the reality of today, where signals are digitally encoded and distributed over myriad platforms, including radio frequency, cable, satellite and the Internet. While early advances introduced the world to color screens and remote control, more recent developments have brought viewers in touch with high definition broadcasts, plasma displays, electronic program guides and video-on-demand.

Yet, the basic process for watching television has not changed in decades. Viewers still tend to turn on the television, select a channel, and watch the television program available on that channel. Recognizing that this basic process is unlikely to change, efforts have turned to enhancing the resulting viewing experience, making it more "interactive" for viewers within the domain of a service provider. In particular, the creator of a particular television program, or the service provider itself, can design additional content to be rendered available to viewers at certain key moments in the television program. The additional content accompanies the particular television program delivered from the service provider, and is made available to multiple viewers of the same channel who have accepted an invitation to receive the additional content.

It will be noted that because the same additional content is shared amongst multiple viewers, the additional content needs to be pre-configured so as to appeal to a relatively wide viewer base, in order for the interactive service to remain profitable for the service provider. As a result, service providers tend to limit their design of additional content so as to achieve a high likelihood of such content being watched by viewers. Ultimately, however, this has the effect of exposing viewers to a stale environment with dubious claims to interactivity.

It is thus apparent that a need exists to improve the viewing experience offered by an interactive environment.

SUMMARY OF THE INVENTION

In accordance with a first aspect of the present invention, there is provided a method executable by at least one computing entity, comprising: obtaining a plurality of descriptive information elements; parsing at least some of the descriptive information elements into one or more subsets of information elements associated with respective information categories; retrieving online content for each of the one or more subsets of information elements; and causing the retrieved online content to be presented to a user.

In accordance with a second aspect of the present invention, there is provided a computer-readable storage medium comprising a set of instructions for execution by a computing device, wherein execution of the set of instructions by the computing device causes the computing device to execute a method that includes: obtaining a plurality of descriptive information elements; parsing at least some of the descriptive information elements into one or more subsets of information elements associated with respective information categories; retrieving online content for each of the one or more subsets of information elements; and causing the retrieved online content to be presented to a user.

In accordance with a third aspect of the present invention, there is provided a method executable by a computing device, comprising: obtaining descriptive information for a media element; parsing the descriptive information into one or more categorized information subsets associated with respective content groups; retrieving online content pertaining to each of the content groups based on the respective one of the one or more categorized information subsets; and causing the online content for each of the content groups to be presented to a user.

In accordance with a fourth aspect of the present invention, there is provided a computer-readable storage medium comprising a set of instructions for execution by a computing device, wherein execution of the set of instructions by the computing device causes the computing device to execute a method that includes: obtaining descriptive information for a media element; parsing the descriptive information into one or more categorized information subsets associated with respective content groups; retrieving online content pertaining to each of the content groups based on the respective one of the one or more categorized information subsets; and causing the online content for each of the content groups to be presented to a user.

In accordance with a fifth aspect of the present invention, there is provided a method for delivering interactivity to viewers of television programs, comprising: receiving a request for interactivity from a viewer of a television program; obtaining descriptive information associated with the television program; parsing the descriptive information into subsets associated with respective categories; retrieving categorized online content on a basis of the descriptive information in each respective subset; and formatting the categorized online content for delivery to the viewer.

In accordance with a sixth aspect of the present invention, there is provided an apparatus for delivering interactivity to viewers of television programs, comprising: an interface configured to receive a request for interactivity from a viewer of a television program; an interactivity manager configured to obtain descriptive information associated with the television program, to parse the descriptive information into subsets associated with respective categories and to retrieve categorized online content on a basis of the descriptive information in each respective subset; and a formatting entity configured to format the categorized online content for delivery to the viewer.

In accordance with a seventh aspect of the present invention, there is provided a computer-readable storage medium comprising a set of instructions for execution by a computing device, wherein execution of the set of instructions by the computing device causes the computing device to execute a method for delivering interactivity to viewers of television programs, the method including: receiving, over a communication channel, a request for interactivity from a viewer of a television program; obtaining descriptive information associated with the television program; parsing the descriptive information into subsets associated with respective categories; retrieving categorized online content on a basis of the descriptive information in each respective subset; and formatting the categorized interactive content for delivery to the viewer over the communication channel.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 3A-3C show some non-limiting possibilities for the layout of a viewer's screen that includes an interactive viewing area for the delivery of categorized online content in an interactive fashion.

It is to be expressly understood that the description and drawings are only for the purpose of illustration of certain embodiments of the invention and are an aid for understanding. They are not intended to be a definition of the limits of the invention.

DETAILED DESCRIPTION

Figure 1A:
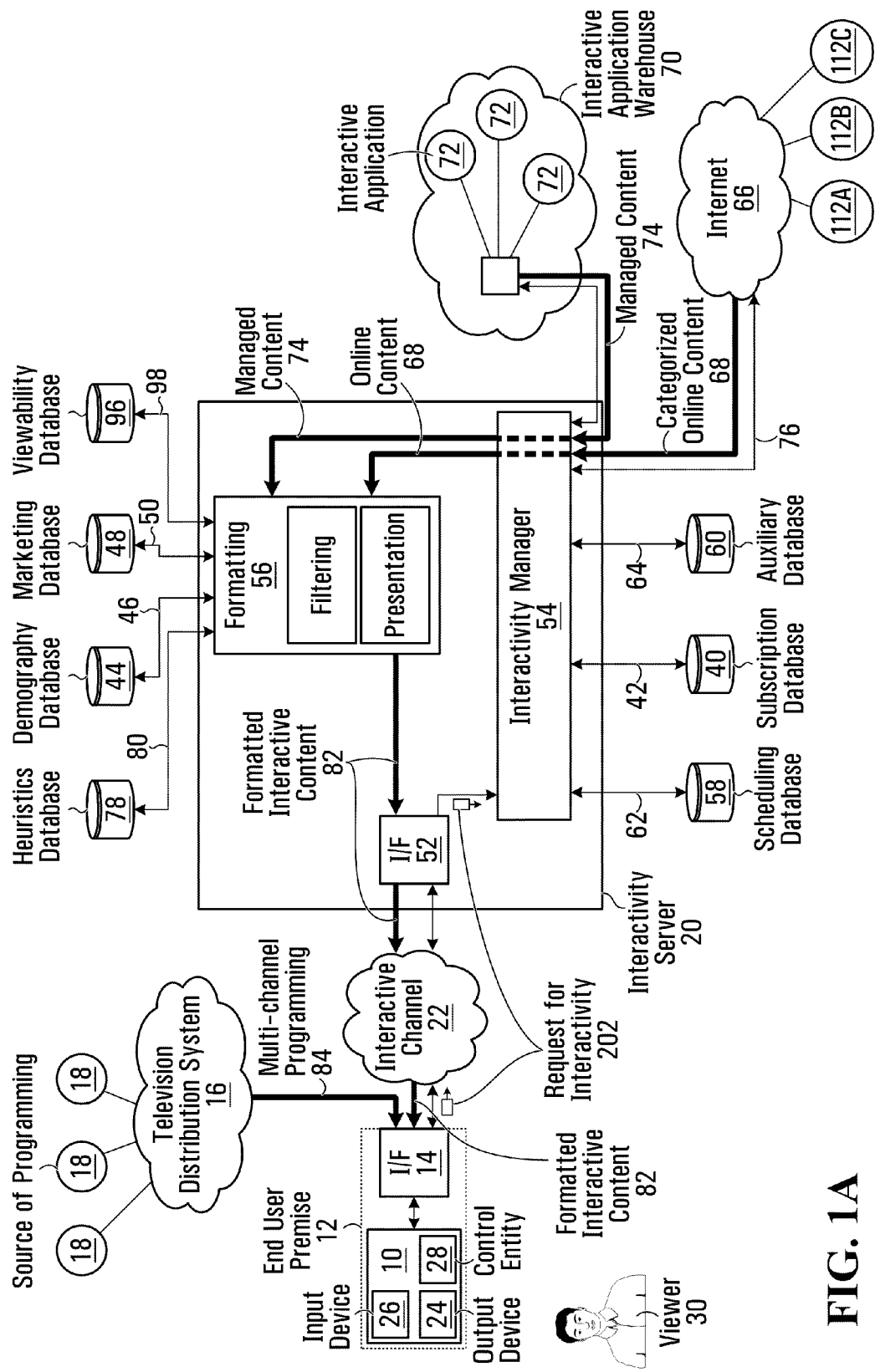
FIG. 1A is a block diagram of an architecture for delivering interactive services, in accordance with a first non-limiting embodiment of the present invention.

Reference is made to FIG. 1A, which shows an architecture for delivery of interactive television services, in accordance with a first non-limiting embodiment of the present invention. A television set 10 at an end user premise 12 (which can be fixed or mobile) is connected to an interface 14 that receives multi-channel television programming 84 from one or more sources of programming 18 over a television distribution system 16. In the first non-limiting embodiment being described here, the television distribution system 16 can take on various forms, including a radio frequency distribution system (i.e., conventional airwaves), a cable distribution system, a satellite distribution system or an Internet distribution system. (Other possibilities exist, some of which will be described later on with reference to FIG. 1B.) The interface 14 may also take on various forms, and generally can comprise transmit and/or receive circuitry as well as equipment such as a modulator/demodulator (modem) and/or an encoder/decoder (codec). In some cases, the interface 14 can be integrated with end user equipment such as a cable modem or a set top box supplied by a cable or satellite company. Alternatively, the interface 14 may be integrated with the television set 10. Alternatively still, the interface 14 may be incorporated into a video capable device at the end user premise 12, such as a Blu-Ray player, game console, etc.

The television set 10 includes at least one output device 24, at least one input device 26 and a control entity 28. The at least one input device 26 allows a viewer 30 to select a program for viewing. This selection is detected and interpreted by the control entity 28 which, in response, controls conveyance of an audio visual signal over the at least one output device 24, which can include a display and a loudspeaker. The control entity 28 can in some cases implement a personal video recording (PVR) function, allowing received television programs to be recorded and played back at a later time via the at least one output device 24. The at least one input device 26 can include a console. Alternatively or in addition, a remote control (not shown) can be used by the viewer 30 to control operation of the television set 10 and/or the interface 14. In still other cases, the television set 10 is implemented as a computer and thus the at least one input device 26 can include one or more of a keyboard, a mouse, a touch-sensitive screen, microphone, game controller, etc.

One feature of the control entity 28 is the ability to detect an expression of interest in obtaining interactive content, as supplied by the viewer 30 via the at least one input device 26 (e.g., the console, remote control, keyboard, mouse, touch-sensitive screen, microphone, game controller, etc.). More specifically, the viewer's interest in obtaining interactive content can be expressed during viewing of a particular television program by hitting a dedicated button on a remote control, by pressing a predetermined sequence of keys on a remote control or keyboard, by clicking a dedicated area on a graphical user interface using a mouse or by touching the dedicated area directly on-screen, etc. It is also envisaged that the viewer 30 may speak a command (e.g., "please give me interactive content") into a microphone. The control entity 28 is operative to convert the detected expression of interest into a request for interactivity. The request for interactivity, as well as potentially other data resulting from viewer-provided inputs, is conveyed via the interface 14 to an interactivity server 20 over a communication channel hereinafter referred to as an interactive channel 22.

The interactive channel 22 can take on many forms. One possibility is for the interactive channel 22 to be established over a telephony line that connects the end user premise 12 to the public switched telephone network (PSTN). In this case, the interactivity server 20 could be coupled to a modem that is reachable over the PSTN at a specific telephone number that can be dialed by the interface 14. Another possibility is for the interactive channel 22 to be established over an upstream (reverse) channel of a cable distribution system. In this case, the interactivity server 20 could be connected to a cable head end that is reachable over the upstream channel. Yet another possibility is for the interactive channel 22 to be established over a connection that traverses the Internet, access to which is provided by an Internet service provider (ISP). In this case, the interactivity server 20 could be implemented as a website that is reachable over the Internet at a specific address. It should be noted that Internet access could be provided wirelessly using WiMax, WiFi, etc.

The interactive channel 22 between the interactivity server 20 and the end user premise 12 is established for a particular "customer" who subscribes to interactive services that are provided by the interactivity server 20. The particular customer may have a business relationship with an operator of the interactivity server 20, whereby payment may be made to the operator on a monthly, per-use or other basis for the privilege of enjoying the interactive services provided by the interactivity server 20. To this end, equipment at the end user premise 12 (e.g., a set top box or cable modem to which the interface 14 may be integrated) may also be controlled by the operator of the interactivity server 20.

In one embodiment, the operator of the interactivity server 20 also controls and/or operates the television distribution system 16. In an alternative embodiment, a completely separate business relationship may be established (with a different commercial entity) for the purposes of connecting the end user premise 12 to the television distribution system 16. In another alternative embodiment, access to the television distribution system 16 may be free of charge (e.g., in the case of a radio frequency distribution system), requiring no special relationship between the end user premise 12 and the television distribution system 16.

It should be appreciated that decoupling of the television distribution system 16 from the interactive channel 22 leads to a certain flexibility in the establishment of the interactive channel 22 itself. Specifically, the manner in which the multi-channel television programming 84 is received from the sources of programming 18 does not constrain the manner in which the interactivity server 20 is reached for the purposes of establishing the interactive channel 22. To illustrate, let it be assumed that the end user premise 12 has access to the Internet and let it further be assumed that the interactivity server 20 is a website that is reachable over the Internet at a specific address. In this case, the interface 14 can be initialized to reach the interactivity server 20 at its specific address without regard to the manner in which the multi-channel television programming 84 is received from the sources of programming 18. It should be appreciated that initialization can take place by way of a software download received by the interface 14 on a specific channel over the television distribution system 16. Alternatively, initialization can take place during manufacturing of the interface 14 (or of the television set 10, if the interface 14 is integrated therewith). Alternatively still, initialization can take place through interaction with an end user after the interface 14 is shipped.

It should also be appreciated that the particular customer is but one of many other customers who may subscribe to interactive services that are provided by the interactivity server 20. As customers are basically entities created for the purposes of accounting, each may include such identifying information as a name, address and account number in order to assist the operator of the interactivity server 20 to discriminate among them. Additional information may also be associated with each customer and be held in various customer-centric databases, as will now be described.

In one example, the particular customer may subscribe to certain interactive television applications that may be offered by various suppliers. Accordingly, the architecture in FIG. 1A is shown to include a subscription database 40, which stores the particular customer's identifying information together with identifying information regarding the interactive application(s) to which the particular customer subscribes. The interactivity server 20 has access to the subscription database 40 along a communication link 42, which may be a logical or physical communication link.

Another example of a customer-centric database is a demography database 44, which stores the particular customer's identifying information in addition to demographic information regarding the particular customer. Examples of demographic information can include age, gender, race, income, number of children, nationality and location (e.g., street address, postal code or latitude/longitude), to name a few non-limiting possibilities. The interactivity server 20 has access to the demography database 44 along a communication link 46, which may be a logical or physical communication link.

Yet another example of a customer-centric database is a marketing database 48, which can be a subset of the demography database 44. The marketing database 48 stores the particular customer's identifying information in addition to marketing information pertaining to the particular customer. Examples of marketing information include brands purchased by the particular customer, commercial establishments (either brick-and-mortar or online) visited by the particular customer, targeted marketing information collected by various marketing agencies, and so on. The interactivity server 20 has access to the marketing database 48 along a communication link 50, which may be a logical or physical communication link.

Still other customer-centric databases may be provided in the architecture of FIG. 1A for the purpose of storing additional information pertaining to the particular customer. It should also be understood that although the databases 40, 44, 48 are shown in FIG. 1A as being separate entities, any two or more of the databases may be combined into a single structure.

The interactivity server 20 comprises an interface 52 of its own, as well as an interactivity manager 54 and a formatting entity 56. The interface 52 regulates the flow of data along the interactive channel 22. That is, upstream data (such as a request for interactivity) arriving from the interface 14 over the interactive channel 22 is directed by the interface 52 towards the interactivity manager 54, whereas "formatted interactive content" 82 received from the formatting entity 56 is placed by the interface 52 onto the interactive channel 22 and released towards the interface 14.

The interactivity manager 54 executes an interactivity process in response to a request for interactivity received from the interface 14. To this end, the interactivity manager 54 can be implemented using hardware, software, firmware, control logic or any combination thereof. In particular, the interactivity manager 54 may comprise a processor and a memory, where the memory stores computer-readable instructions that are executable by the processor and which, when read by the processor, cause the interactivity process to be executed. In order to execute the interactivity process, which will be described in further detail later on, the interactivity manager 54 consults and has access to one or more of the aforementioned customer-centric databases including, in particular, the subscription database 40. In addition, the interactivity manager 54 may consult and have access to other databases which can include, in some cases, a scheduling database 58 and an auxiliary database 60.

The interactivity manager 54 has access to the scheduling database 58 along a communication link 62, which may be a logical or physical communication link. The scheduling database 58, if used, stores scheduling information and descriptive information associated with various television programs that may be transmitted by the sources of programming 18. Descriptive information associated with a particular television program can be regarded as information that characterizes the particular television program. To this end, the scheduling database 58 stores a broadcast program grid, which includes a plurality of entries having coordinates along two scheduling information axes. One of the scheduling information axes includes a time line and the other scheduling information axis includes a set of channels. The entry associated with a particular time interval (i.e., a range of points along the time line) and a particular channel comprises descriptive information associated with the television program being broadcast on the particular channel during the particular time interval. In a non-limiting example embodiment, the descriptive information may take the form of metadata.

The entries in the scheduling database 58 may be coarsely or finely granular with respect to the time intervals they represent, and this can have an influence on the descriptive information that the entries can store. Consider first the case of coarsely granular scheduling database entries that represent time intervals lasting several minutes or more. In an example where the television program being broadcast on the particular channel is a serial television show, the descriptive information may include a title of the television show, an episode number (if applicable) and the identity (including the Internet address) of a particular one of the sources of programming 18 associated with the particular channel (e.g., the name of a media network, such as ABC, CNN, CTV, Fox, etc.). In an example where the television program being broadcast on the particular channel is a sporting event, the descriptive information may include an indication of the sport (e.g., hockey, football, women's tennis, etc.), a level of the event (e.g., regular season game, playoff, final, etc.) and the identity (including the Internet address) of a particular one of the sources of programming 18 associated with the particular channel (e.g., the name of a media network, such as CBS, TSN, CTV, etc.).

Consider now the case of finely granular scheduling database entries that represent time intervals lasting only a few seconds each. Such short intervals can be used to provide, from a broadcaster's traffic system, statistical data during a sporting event or other detailed scheduling data. For example, where the television program being broadcast on the particular channel is a television show, the descriptive information stored in the scheduling database 58 may include, in addition to the information referred to above, the identity of a particular actor or product placement (e.g., a Ford vehicle) appearing on screen at the current time. In an example where the television program broadcast aired on the particular channel is an advertisement for a product or service, the descriptive information may include the name of the product or service being advertised and the name of the company whose product or service is being promoted. For sporting events, the descriptive information may include statistical data that is valid at the current time.

The scheduling database 58 may also comprise individual program timelines for non-broadcast television programs, such as playback of a movie from a digital library or playback of a previously recorded program (such as a TV series or sporting event, which may have been broadcast at the time of recording, but is no longer being broadcast at the time of playback). The individual program timeline for a particular non-broadcast television program includes a plurality of entries corresponding to time intervals relative to a start time of the television program. The time intervals can be as coarsely or as finely granular as desired. The entry associated with a particular time interval comprises descriptive information associated with the television program. When the television program is being played back, time will elapse from the start time, and thus a "relative time of occurrence" within the television program will keep advancing. When a requestor (e.g., the interactivity manager 54) supplies the identity of a particular television program (e.g., the name of a movie or sporting event) and the relative time of occurrence within the particular television program (i.e., how much time has elapsed since the beginning of the movie or sporting event), the scheduling database 58 is operative to identify the entry associated with the appropriate time interval of the appropriate individual program timeline, and will return the descriptive information contained therein to the requestor.

It should also be appreciated that descriptive information associated with a particular television program can also be obtained by consulting the auxiliary database 60. The interactivity manager 54 has access to the auxiliary database 60 along a communication link 64, which may be a logical or physical communication link. The auxiliary database 60, if used, stores descriptive information that is associated with input criteria identifying various television programs. (In some embodiments, the input criteria may be a subset of descriptive information that was obtained from the scheduling database 58, in which case the descriptive information stored in the auxiliary database 60 can be regarded as "enhanced" descriptive information.)

In an example where the input criteria identify a particular television show, the descriptive information stored in the auxiliary database 60 may include additional information known to be associated with the show. This may include, inter alia, the names of actors, producers, directors or other participants having a role in the show, a list of other shows that those participants may have participated in, the type of show (e.g., comedy, drama, movie, etc.), a list of awards that the show may have won or for which the show may have been nominated, a description of the show, a list of key words associated with the show, a list of topics that are scheduled to be discussed in the show (such as during a news segment or a talk show), a collection of other electronic program guide (EPG) data pertaining to the show (e.g., ratings (e.g., "G", "R", "18+", etc.), qualifiers (such as HD, closed captioned, Dolby stereo, etc.), etc.), an indication of the location of the currently viewed scene (e.g., Disney World, etc.), the Internet address of a sanctioned website of the show, etc. It should be understood that there is no particular demarcation between the range of descriptive information that may be stored in the scheduling database 58 and the range of descriptive information that may be stored in the auxiliary database.

In an example where input criteria identify a particular sporting event, the descriptive information stored in association therewith may include, for example, the names of teams, athletes, coaches or other participants having a role in the sporting event, the season or career statistical data pertaining to these participants (e.g., goals, assists, penalty minutes, goals-against average, earned-run average, home runs, wins, losses, corner kicks resulting in goals, aces on first serve in matches played in May at an altitude above 2000 m, etc.), team statistical data, league statistical data, etc.

It should be apparent to those of skill in the art that other types of information may fall under the rubric of "descriptive information associated with a television program", and that the descriptive information associated with a television program can be linked, arranged and searchable within the scheduling database 58 and the auxiliary database 60 in a variety of ways.

Also as part of the interactivity process executed by the interactivity manager 54, the interactivity manager 54 causes retrieval of the data to be ultimately released towards the end user premise 12 over the interactive channel 22. This is achieved by retrieving online content from the Internet 66 on a per-category basis (referred to as "categorized online content" and denoted 68) and directing the categorized online content 68 towards the formatting entity 56. Accordingly, the interactivity manager 54 is assumed to have access to the Internet 66 over a communication link 76. It is noted that where the interactive channel 22 itself traverses the Internet 66, the interactivity server 20 need not require a second connection to the Internet 66. The interactivity manager 54 may also have access to an interactive application warehouse 70 that supports one or more interactive applications 72 for consumption by a variety of customers including the particular customer. The interactivity manager 54 further has the capability to trigger one or more of the interactive applications 72, resulting in the generation of "managed content" 74. By "managed content" is meant content over which the operator of the interactivity server 20 has control. The interactivity manager 54 also has the capability to direct the managed content 74 towards the formatting entity 56, for eventual delivery to the end user premise 12 over the interactive channel 22.

The formatting entity 56 executes a formatting process on (i) the managed content 74, if any, received from the interactive application warehouse 70 via the interactivity manager 54 and (ii) the categorized online content 68 received from the Internet 66 via the interactivity manager 54. To this end, the formatting entity 66 can be implemented using hardware, software, firmware, control logic or any combination thereof. In particular, the formatting entity 66 may comprise a processor and a memory, where the memory stores computer-readable instructions that are executable by the processor and which, when read by the processor, cause the formatting process to be executed. The formatting process involves a filtering sub-process and a presentation sub-process, which will be described in further detail later on. The output of the formatting entity 56 is the formatted interactive content 82 that is provided to the interface 52. In order to execute the formatting process, the formatting entity 56 consults and has access to various ones of the aforementioned databases, including the demography database 44 and the marketing database 48. The formatting entity 56 also consults and has access to one or more other databases which can include, in some cases, a heuristics database 78 and a viewability database 96.

The heuristics database 78, if used, stores information regarding certain habits, preferences, opinions, etc., of the viewer 30 individually as well as within the larger context of a viewing community. For example, the heuristics database 78 may store peer ratings collected from online blogs regarding a television show. The heuristics database 78 may also store feedback received from viewers (including the viewer 30) that have been previously presented with certain online content, thus indicating a spectrum of viewer reactions which can be combined with demographic and marketing information to influence the manner in which information is formatted for the viewer 30. The formatting entity 56 has access to the heuristics database 78 along a communication link 80, which may be a logical or physical communication link.

The viewability database 96, if used, stores information regarding a plurality of online addresses (e.g., web sites, web pages, etc.) and a degree to which the content made available online by those online addresses is suited for presentation in an interactive viewing area at the end user premise 12. This information may be collected as a background operation, either directly by the service provider or by a third part on behalf of the service party. The formatting entity 56 has access to the viewability database 96 along a communication link 98, which may be a logical or physical communication link.

Although FIG. 1A shows the databases 40, 44, 48, 58, 60, 78 as discrete components to which the interactivity server 20 has access, it should be appreciated that one or more of the aforementioned databases can be combined into a single database. It should also be appreciated that one or more of the aforementioned databases may be integrated with the interactivity manager 54 and/or the formatting entity 56 and/or other components of the interactivity server 20.

The formatted interactive content 82 reaches the interface 14 along the interactive channel 22. Meanwhile, as will be recalled, the multi-channel television programming 84 is available to the interface 14 via the television distribution system 16. On the basis of selections made by the viewer 30 via the at least one input device 26, the interface 14 allows one or more selected channels of television programming to reach the television set 10 for conveyance to the viewer 30. In addition, a blending function in the interface 14 and/or the control entity 28 blends the selected channel(s) with the formatted interactive content 82 to create a composite television signal for presentation to the viewer 30 over the at least one output device 24.

Figure 3B:
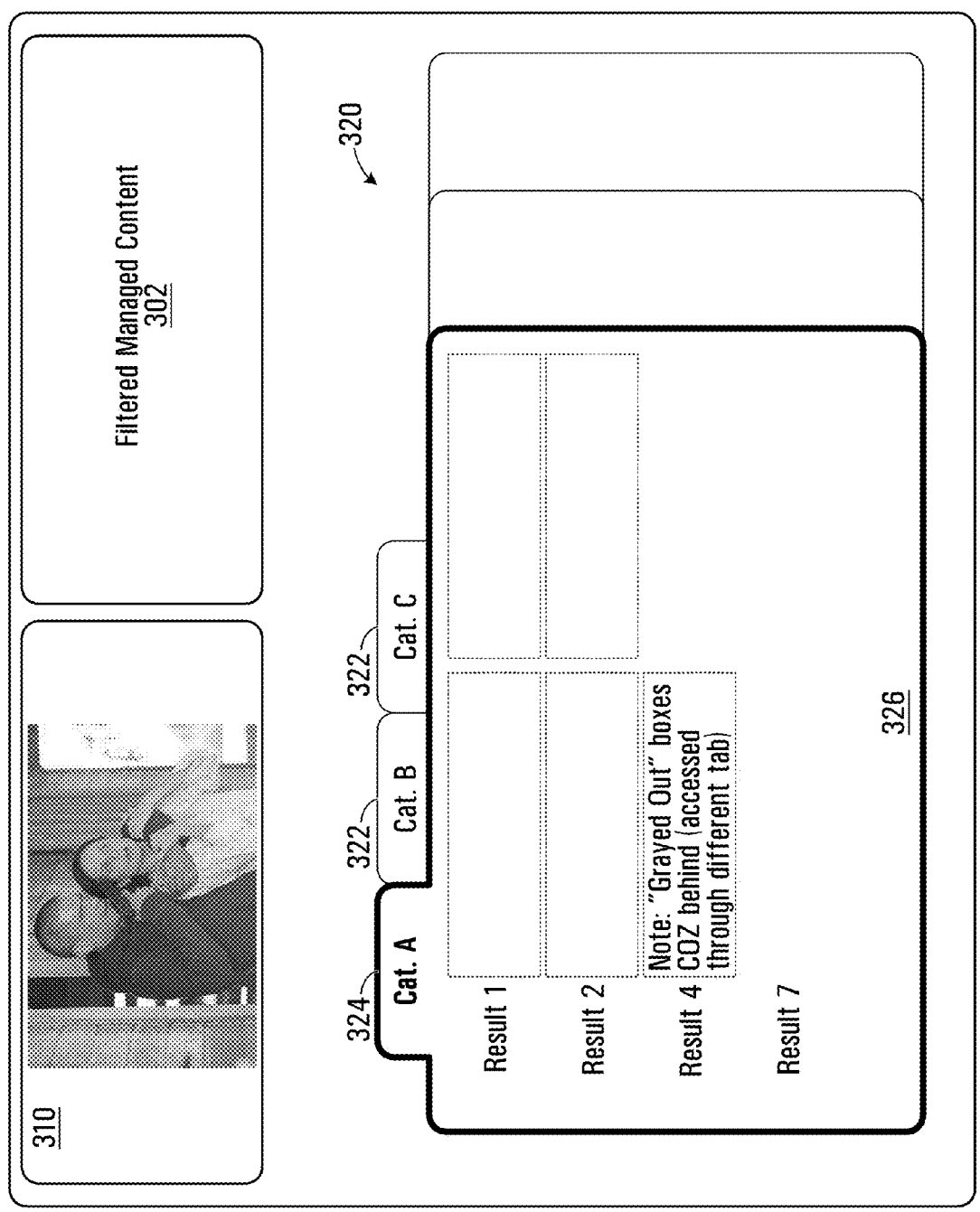

With reference now to FIGS. 3A-3C, the composite television signal, when displayed on a screen 300 (which is an example of the at least one output device 24), will be perceived by the viewer 30 to include a TV viewing area 310 graphically conveying the selected channel(s) and an interactive viewing area 320 graphically conveying the formatted interactive content 82. Further details regarding the size, shape and configuration of the TV viewing area 310 and the interactive viewing area 320 will be provided later on in this description.

Figure 1B:
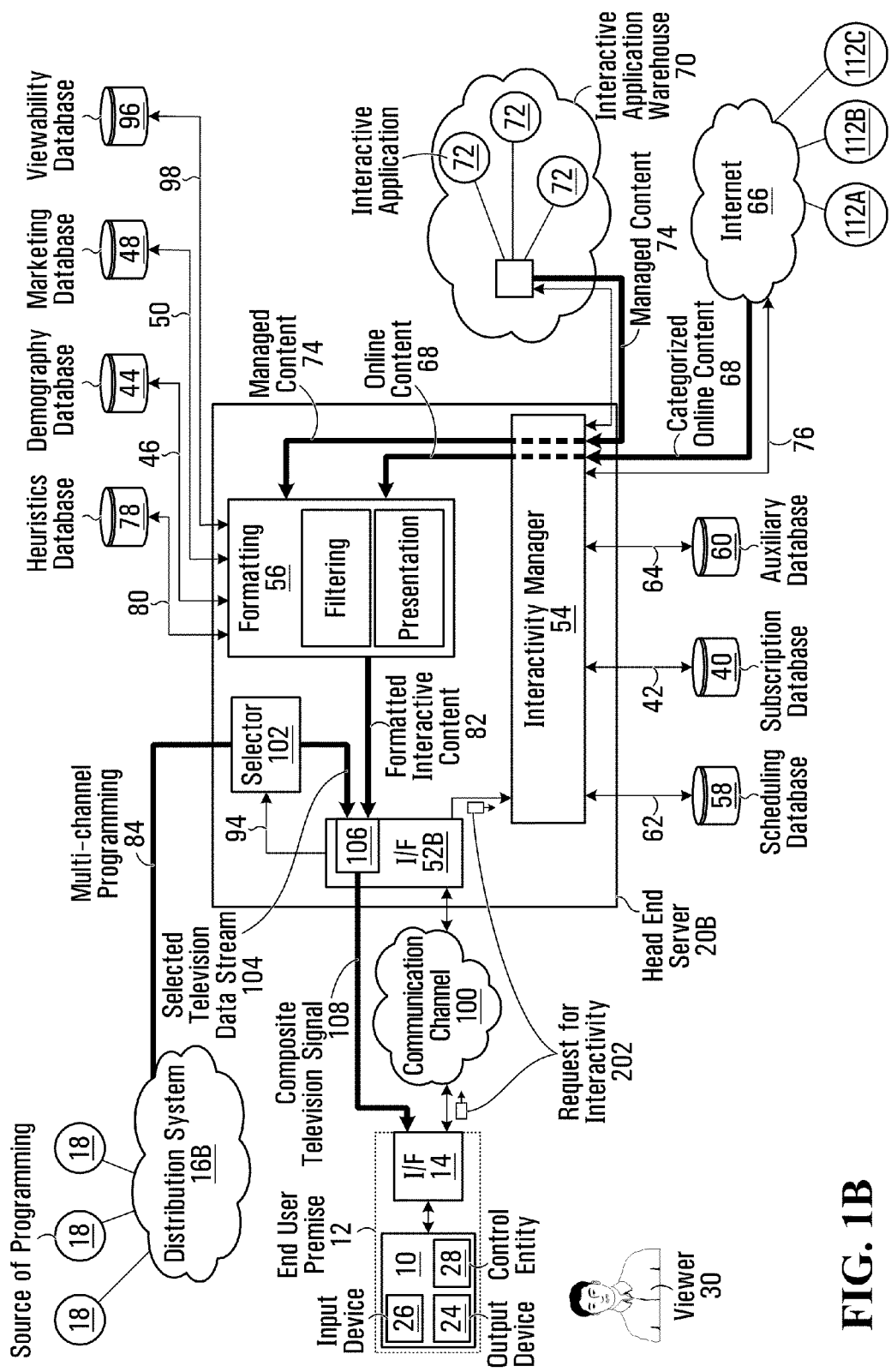
FIG. 1B is a block diagram of an architecture for delivering interactive services, in accordance with a second non-limiting embodiment of the present invention.

Reference is now made to FIG. 1B, which shows an architecture for delivery of interactive television services in accordance with a second non-limiting embodiment of the present invention. The architecture in FIG. 1B is similar to the architecture in FIG. 1A and includes many very similar or identical elements, such as the end user premise 12, the television set 10, the databases 40, 44, 48, 58, 60, 78, the Internet 66, the interactive application warehouse 70 and the sources of programming 18. However, certain elements are different. Most notably, in the architecture in FIG. 1B, it will be observed that a bidirectional communication channel 100 exists between an interface 14B at the end user premise 12 and a head end server 20B. The communication channel 100 is used to deliver both television programming and interactive services to the end user premise 12. Other communication channels are similarly used to deliver television programming and interactive services to other end user premises.

The arrangement of FIG. 1B is possible and convenient when both the television programming and the interactive services are controlled or operated by the same commercial entity or "service provider". In this case, a relationship is established between the service provider (offering both television programming and interactive services) and a particular "customer" (which is an abstraction of an entity that presumably owns or operates the end user premise 12) so as to allow the viewer 30 to enjoy the privilege of being able to (i) view television programs distributed by the service provider (which may originate from third party content providers) and (ii) participate in interactive services offered by the service provider. It will be appreciated that payment for this privilege may be made to the service provider on a monthly, per-use or any other agreed upon basis.

The arrangement of FIG. 1B may tend to arise in an IPTV environment, where the communication channel 100 traverses a service-provider-controlled packet-switched network that enables IP connections. Some of these IP connections may be dedicated to television streaming, while others may carry selections (e.g., channel changes) from the viewer 30 to the head end server 20B. Within the communication channel 100, various unidirectional or bidirectional subchannels may be created for the conveyance of specific information such as television data streams, channel changes, requests for interactivity and formatted interactive content, to name a few non-limiting possibilities. A similar description could apply to a mobility environment, where the communication channel 100 traverses a service-provider-controlled wireless network (such as a mobile telephony network) that enables wireless data connections. Still other instances where the arrangement of FIG. 1B may tend to arise will be apparent to those of skill in the art. One such instance is a cable distribution environment, where the communication channel 100 could traverse a cable-company-controlled packet-switched network that enables IP connections.

The interface 14B present at the end user premise 12 is virtually identical to the interface 14, except that it is adapted to support the above communication channel 100. In an IPTV (or cable) environment, the interface 14B can be integrated with a set top box (or cable modem) supplied by an IPTV (or cable) service provider, whereas in a mobility environment, the interface 14B can be integrated with a mobile device that implements the television set 10.

The head end server 20B is one part of a larger service provider infrastructure, which may include one or more of the aforementioned databases 40, 44, 48, 58, 60, 78, the interactive application warehouse 70 and possibly even the sources of programming 18 to the extent that the service provider acts as an aggregator of television programs from different sources. The head end server 20B comprises an interface 52B, the interactivity manager 54 and the formatting entity 56. The interactivity manager 54 and the formatting entity 56 operate as previously described. That is, the interactivity manager 54 executes the aforementioned interactivity process in response to a request for interactivity received from the interface 14B, while the formatting entity 56 executes the aforementioned formatting process on the managed content 74 (if any) and the categorized online content 68.

In addition, the head end server 20B may include a selector 102 that supplies a selected television data stream 104 to the interface 52B. The selector 102 receives multi-channel programming 84 from the sources of programming 18, either directly or over a television distribution system 16B. For the particular customer, the selector 102 can select one or more of the television channels to be released to the interface 52B in the form of the selected television data stream 104. As television channel selection is affected by viewer input (specifically, channel changes made by the viewer 30), the selector 102 operates under the influence of upstream data received by the interface 52B along the communication channel 100.

In general, the interface 52B regulates the flow of data (including both television programming and interactive data) along the communication channel 100. In particular, certain upstream data (such as channel changes) arriving from the interface 14B over the communication channel 100 is directed by the interface 52B towards the selector 102 for control thereof. To this end, the interface 52B is connected to the selector 102 by a link 94. Other upstream data (such as requests for interactivity) is directed by the interface 52B towards the interactivity manager 54. In the downstream direction, the interface 52B places the aforementioned formatted interactive content 82 received from the formatting entity 56 onto the communication channel 100. Also in the downstream direction, the interface 52B places the selected television data stream 104 onto the communication channel 100.

In the arrangement of FIG. 1B, a blending function 106 is implemented by the interface 52B. The blending function 106 blends the selected television data stream 104 with the formatted interactive content 82 to create a composite television signal 108 that is encoded and sent to the end user premise 12 over the communication channel 100. The interface 14B and the control entity 28 then cooperate to present the composite television signal 108 to the viewer 30 over the at least one output device 24.

With reference to FIGS. 3A-3C, when the composite television signal 108 is displayed on the aforementioned screen 300, the viewer 30 will perceive the aforementioned TV viewing area 310 graphically conveying the selected television data stream 104 and the aforementioned interactive viewing area 320 graphically conveying the formatted interactive content 82.

In a variant of the arrangement of FIG. 1B, the selected television data stream 104 and the formatted interactive content 82 are conveyed to the end user premise 12 over the communication channel 100. In this case, a blending function in the interface 14B and/or the control entity 28 blends the selected television data stream 104 with the formatted interactive content 82 to create a composite television signal for presentation to the viewer 30 over the at least one output device 24. The composite television signal is displayed on the screen 300 in much the same way as was previously described.

Figure 2A:
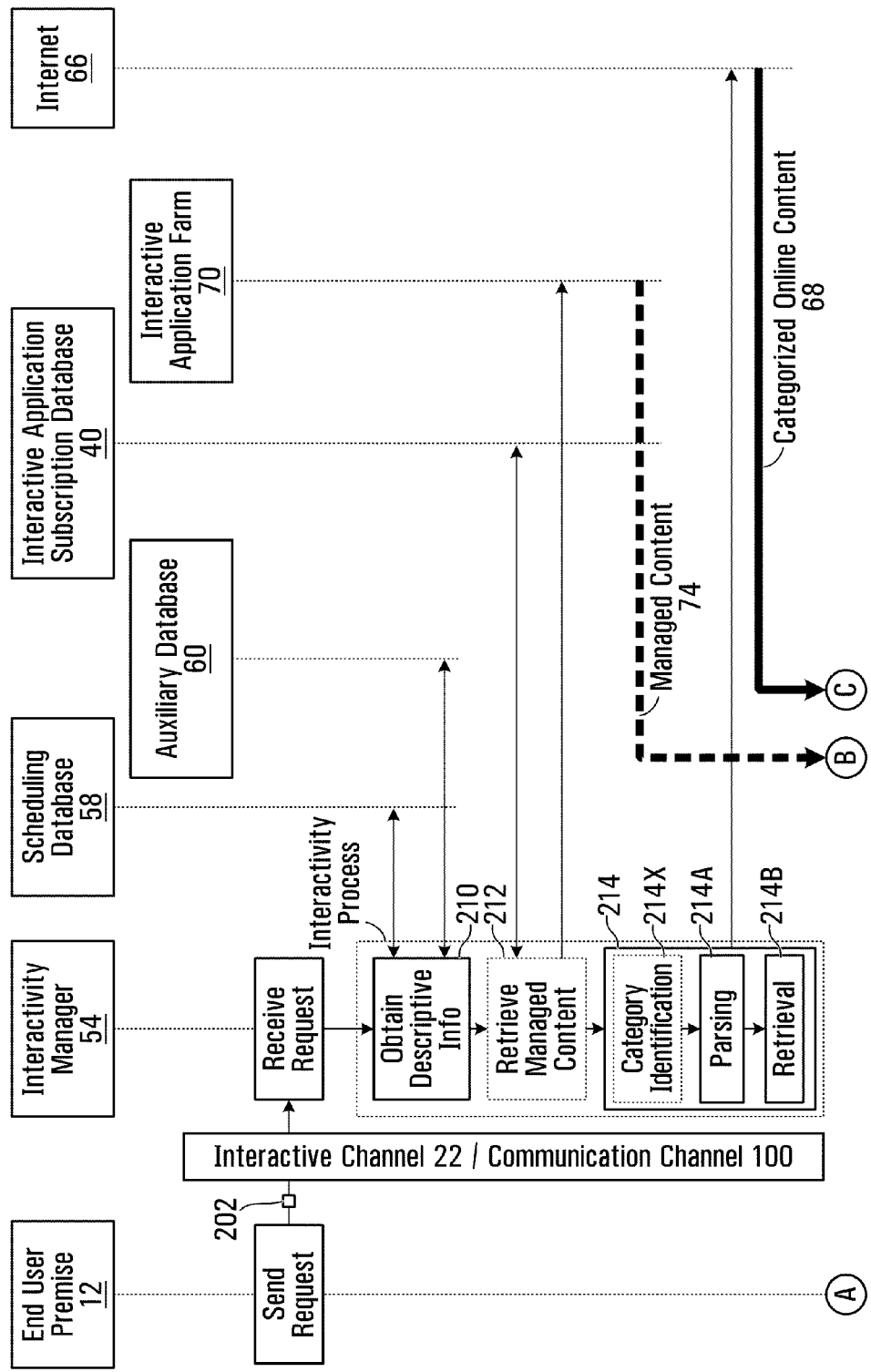
FIGS. 2A and 2B are portions of a flow diagram illustrating specific non-limiting steps in an interactivity process and a formatting process performed in the course of delivering interactive services in the architectures of FIGS. 1A and 1B.
Figure 2B:
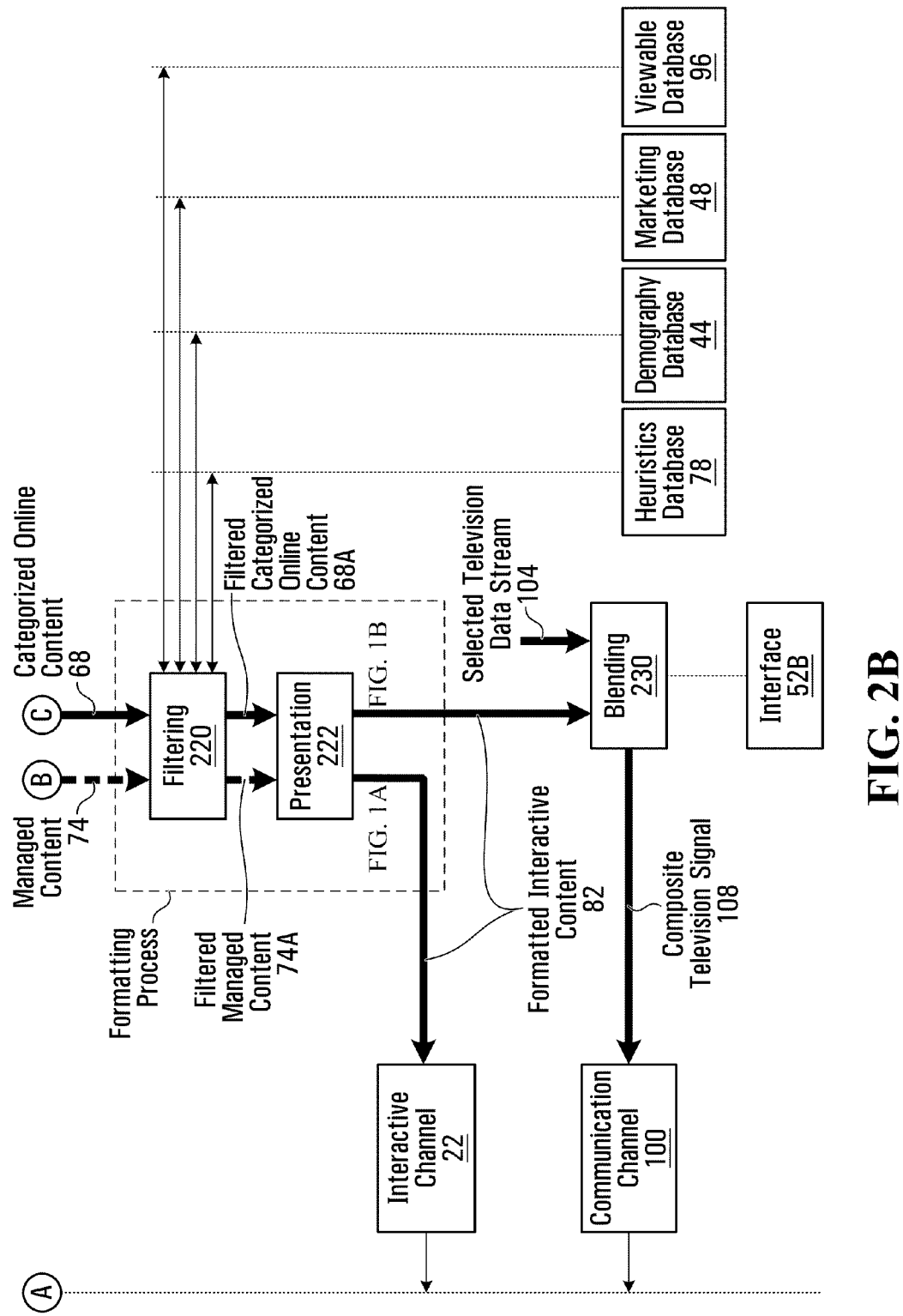

FIGS. 2A and 2B are portions of a flow diagram illustrating various steps in the interactivity process executed by the interactivity manager 54 and in the formatting process executed by the formatting entity 56. To begin with, and referring specifically to FIG. 2A, it is assumed that a request for interactivity 202 has been sent from the end user premise 12 in response to detection by the control entity 28 of an expression of interest by the viewer 30 in obtaining interactive content while viewing a particular television program on a particular channel. As explained previously, the viewer 30 can express such interest by hitting a dedicated button on a remote control, by pressing a predetermined sequence of keys on a remote control or keyboard, by clicking a dedicated area on a graphical user interface using a mouse or by touching the dedicated area directly on-screen, etc. It is also envisaged that the viewer 30 may speak a command (e.g., "please give me interactive content") into a microphone.

The request for interactivity 202 travels along the interactive channel 22 (in the case of FIG. 1A) or the communication channel 100 (in the case of FIG. 1B) and is subsequently received at the interface 52 (or 52B) and recognized as being associated with the particular customer. The request for interactivity 202 is forwarded to the interactivity manager 54, which then begins execution of the interactivity process, now described with reference to steps 210-214.

At step 210 of the interactivity process, the interactivity manager 54 obtains one or more "descriptive information elements".

The "descriptive information elements" can comprise information (e.g., a search query) input by the viewer 30 via the at least one input device 26. In a specific non-limiting example, a search query input by the viewer via the at least one input device 26 could be composed of a text string including separators such as spaces, semicolons, "plus" signs, quotes, and the like. In other cases, the viewer 30 may not necessarily be commissioning a specific search for a particular document or link, but rather may be interested in obtaining pertinent information in a number of different information categories.

Alternatively or in addition, the "descriptive information elements" can comprise descriptive information associated with a media element currently of interest to the viewer 30, an example of which is the particular television program being viewed by the viewer 30. Other examples of media elements include websites, pictures, movies, video segments and audio segments. The descriptive information associated with the particular television program may comprise the following, to name a few non-limiting possibilities:

(i) For a serial television show: a title of the television show, an episode number (if applicable), the identity (including the Internet address) of a particular one of the sources of programming 18, the names of actors, producers, directors or other participants having a role in the show, a list of other shows that those participants may have participated in, the type of show, a list of awards that the show may have won or for which the show may have been nominated, a description of the show, a list of key words associated with the show, a list of topics that are scheduled to be discussed in the show, a collection of other EPG data pertaining to the show, an indication of the location of the currently viewed scene, the Internet address of a sanctioned website of the show, etc.;

(ii) For an advertisement: the name of the product or service being advertised and the name of the company whose product or service is being promoted, etc.;

(iii) For a sporting event: an indication of the sport, a level of the event, the identity (including the Internet address) of a particular one of the sources of programming 18 associated with the particular channel, the names of teams, athletes, coaches or other participants having a role in the sporting event, the season or career statistical data pertaining to these participants, team statistical data, league statistical data, etc.

Still other possibilities for the descriptive information pertaining to the above types of television programs (or other types of television programs) will be apparent to those of skill in the art. Also, it should be appreciated that the above examples are merely for illustrative purposes and that a particular television program is of course not limited to being a serial television show, an advertisement or a sporting event.

By way of example, the descriptive information associated with a particular television may be obtained in one or more of the following ways.

(i) A portion of the descriptive information associated with the particular television program may be obtained directly from the request for interactivity 202 by decoding or other processing techniques. For example, the request for interactivity 202 can include the identity of the television program or other information obtained from the end user premise 12.

(ii) A portion of the descriptive information associated with the particular television program may be obtained from the scheduling database 58.

In an example, consider the scenario wherein the request for interactivity 202 includes a current time and an identity of the particular channel. The interactivity manager 54 then accesses the scheduling database 58 over the communication link 62 by providing the current time and the identity of the particular channel. In return, the interactivity manager 54 receives the descriptive information stored in the corresponding entry in the program grid. It is recalled that the descriptive information stored in the corresponding entry in the program grid depends on the nature of the television program and on the granularity (e.g., coarseness or fineness) of the entry.

In another example, consider the scenario wherein, at the current time, the viewer 30 is viewing playback of a previously recorded television program (e.g., using the PVR functionality of the control entity 28). Consider, however, that at the current time, playback has reached a certain "relative time of occurrence" within the television program, which is indicative of how much time has elapsed since the beginning of the television program. In this case, the request for interactivity 202 can include not only the identity of the television program but also the relative time of occurrence. The interactivity manager 54 then accesses the scheduling database 58 over the communication link 62 by providing the identity of the television program and the relative time of occurrence. The scheduling database 58 consults the individual program timelines to determine which entries to consult, and then returns the corresponding descriptive information to the interactivity manager 54.

(iii) A portion of the descriptive information associated with the particular television program may be obtained from the auxiliary database 60. Specifically, the interactivity manager 54 supplies to the auxiliary database over the communication link 64 a portion (i.e., some or all) of the descriptive information that was included in the request for interactivity 202 or obtained from the scheduling database 58. In return, the interactivity manager 54 receives additional descriptive information that the auxiliary database 60 holds as being associated with the portion of the descriptive information supplied thereto.

Still other ways of obtaining the descriptive information associated with a particular television program may become apparent to those of skill in the art.

At step 212 of the interactivity process, which is optional and can be entirely dispensed with, the interactivity manager 54 retrieves the managed content 74. This can begin with a search for an interactive application associated with the particular television program that was being viewed by the viewer 30 when he/she expressed an interest in obtaining interactive content. To this end, the interactivity manager 54 can access the interactive application warehouse 70 to search for one of the interactive applications 72 that may be associated with the particular television program. Assuming that a particular interactive application has been identified, the interactivity manager 54 also accesses the subscription database 40 via the communication link 42 in order to determine whether the particular customer does indeed subscribe to the particular interactive application.

Assuming that it has been determined that the particular customer does subscribe to the particular interactive application, the interactivity manager 54 may instantiate the particular interactive application, which causes the release of the managed content 74. In one embodiment, the managed content 74 may comprise specialized content that is associated with the particular television program. For example, in the case of a live hockey game, the specialized content may include statistical data of the players and teams currently involved in the game, a selection of camera angles to choose from, live action from other hockey games, etc. Alternatively or in addition, the managed content 74 may comprise computer-readable instructions which, when downloaded to and executed by the control entity 28 at the end user premise 12, permits further interaction with the viewer 30 through a local application such as a game or a voting application, for example.

At step 214 of the interactivity process, which follows step 210 or step 212 depending on whether step 212 is implemented, the interactivity manager 54 carries out an online content retrieval process, during which the categorized online content 68 is retrieved based on the one or more "descriptive information elements" obtained at step 210. It is recalled that the descriptive information elements may include information input by the viewer 30 and/or included with the request for interactivity and/or obtained from the scheduling database 58 and/or obtained from the auxiliary database 60. The online content retrieval process of step 214 includes a parsing sub-step 214A and a retrieval sub-step 214B.

Figure 4:
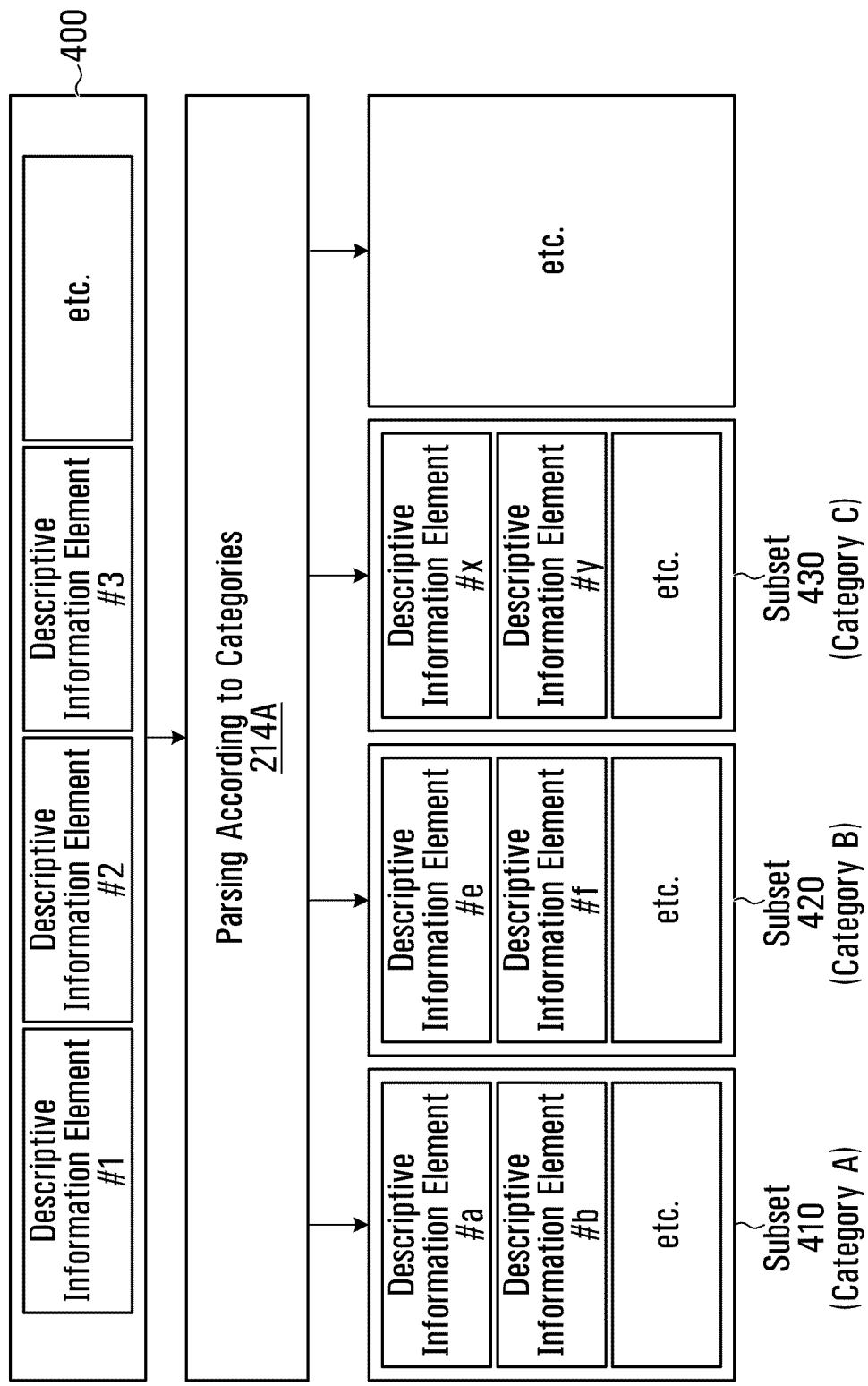
FIG. 4 illustrates a step of parsing descriptive information elements into subsets associated with respective information categories.

With reference to FIG. 4, the parsing sub-step 214A includes subdividing the descriptive information elements (denoted 400) into one or more subsets of information elements 410, 420, 430, etc., associated with respective "content groups" or "information categories" (or simply "categories"). For example, in the illustrated non-limiting embodiment, subset 410 includes those of the descriptive information elements 400 deemed to belong to "category A", subset 420 includes those of the descriptive information elements 400 deemed to belong to "category B", and subset 430 includes those of the descriptive information elements 400 deemed to belong to "category C".

In one example, the categories may be pre-defined by their contents. Thus, each of the descriptive information element 400 is compared to the contents of each of the categories to determine into which category that descriptive information element belongs. Such comparisons can be carried out in parallel or in sequence. It should be appreciated that the outcome of this operation may be that the each of the descriptive information elements 400 belongs to zero, one or more categories. Thus, some of the subsets 410, 420, 430 may contain more than one of the descriptive information elements 400, while some of the descriptive information elements 400 may appear in more than one of the subsets 410, 420, 430.

To take a specific non-limiting example, consider that the information categories include "A", "B" and "C". Consider that the "A" category includes the titles of various television program such as "Prison break", "Lost", "Law & Order" and "Desperate Housewives". Consider that the "B" category includes the names of various actors such as "Wentworth Miller", "Eva Longoria", "Sam Waterston" and "Daniel Dae Kim". Consider that the "C" category includes various demographic cross-sections such as "Female 18-29", Male "35-45", "Female over 65" and Male 6-10". Now consider that the descriptive information elements 400 include "Prison Break", "Male 35-45" and "Wentworth Miller". Such descriptive information elements could be obtained from the request for interactivity 202 or from the scheduling database 58, for example. The parsing sub-step 214A then compares each of the descriptive information elements 400 to the contents of each category and this could result in the conclusion that the descriptive information element "Prison Break" should be placed into the "A" category, the descriptive information element "Male 35-45" should be placed into the "C" category, and the descriptive information element "Wentworth Miller" should be placed in the "B" category.

In another example, each of the descriptive information elements 400 is accompanied by an indicator of the category (or categories) to which it belongs. This simplifies the parsing sub-step 214A, since each descriptive information element can now be placed into the appropriate subset (or subsets) by simply comparing the associated category indicator with the various possible categories rather than with the contents of those categories.

To take a specific non-limiting example, consider that the information categories include "Title". "Actor" and "Demographic", which can include the same content as previously described in respect of the "A", "B" and "C" categories, respectively. Now consider that the descriptive information elements 400 include "Prison Break" accompanied by a category indicator "Title", "Male 35-45" accompanied by a category indicator "Demographic", and "Wentworth Miller" accompanied by a category indicator "Actor". The parsing sub-step 214A would result in the descriptive information element "Prison Break" being automatically placed into the "Title" category, the descriptive information element "Male 35-45" being automatically placed into the "Demographic" category, and the descriptive information element "Wentworth Miller" being automatically placed into the "Actor" category.

In yet another example, the categories into which the descriptive information elements 400 are to be subdivided depend on one or more of the descriptive information elements 400 themselves.

To take a specific non-limiting example, consider that the information categories include "Title", "Actor", "Demographic", "Country/City" and "Sports Team". Now consider that one of the descriptive information elements 400 is indicative of the type of television program being viewed, such as "series", "news segment" or "sporting event" (available from scheduling database 58). It is possible to envisage a preliminary "category identification" step (shown in dashed outline in FIG. 2A as sub-step 214X) whereby, depending on the type of television program being viewed, different categories might be used for the subsequent parsing sub-step 214A. Thus, in the case of a "series", the relevant categories might be "Title", "Actor" and "Demographics", while in the case of a "news segment", the relevant categories might be "Country/City" and "Demographic", and in the case of a "sporting event", the relevant categories might be "Sports Team" and "Demographic".

It should be appreciated that the above examples of possible categories are not limitative. Any category (as well as any number of categories) could be devised, depending on operational requirements.

After the parsing sub-step 214A, the interactivity manager 54 proceeds with the retrieval sub-step 214B whereby the categorized online content 68 is retrieved. To this end, a separate retrieval effort is conducted for each of the subsets 410, 420, 430, i.e., for each of the "content groups" or "information categories". The retrieval efforts can be done in parallel or sequentially.

The categorized online content 68 can be retrieved from one or more sources (e.g., websites) 112A, 112B, 112C connected to the Internet 66. It is envisaged that different sources or combinations of sources may be consulted for retrieving online content in different categories. Non-limiting examples of the sources 112A, 112B, 112C include possibly one or more of:

- A sanctioned website of the particular television program, in which case the online content available for retrieval can comprise information regarding actors, past episodes, upcoming episodes, sponsors, fan reviews, etc. The address of the sanctioned website can be known a priori based on the descriptive information associated with the particular television program, or it can be obtained by providing a portion of the descriptive information to a search engine (e.g., Google, Yahoo, etc.);
- A sanctioned website of the television channel that airs the particular television program, in which case the online content available for retrieval can comprise information regarding other television programs airing on the television channel, etc. The address of the sanctioned website can be known a priori based on the descriptive information associated with the particular television program, or it can be obtained by providing a portion of the descriptive information to a search engine;
- An information server that maintains a moment-by-moment content guide pertaining to the particular television program, in which case the online content available for retrieval may include actor names, product placements and the like. The address of the information server can be known a priori based on the descriptive information associated with the particular television program, or it can be obtained by providing a portion of the descriptive information to a search engine.
  - In one example, where the particular television program is a sporting event, the information server may be a statistics server, in which case the online content available for retrieval may include updated statistical data pertaining to teams, athletes and/or coaches involved in the sporting event;
  - In another example, where the particular television program is a drama, movie or sporting event, the information server may be a blog server, in which case the online content available for retrieval may include moment-by-moment postings by bloggers who are simultaneously watching the drama, movie or sporting event;
- A set of advertisement servers or an advertisement broker, in which case the online content available for retrieval can comprise advertisements targeted to viewers of the particular television program. An auction system could be implemented whereby advertisers submitting the highest bids would be entitled to have their advertisements conveyed to the viewers of the particular television program. The addresses of the advertisement servers and/or the advertisement broker can be known a priori based on the descriptive information associated with the particular television program, or they can be obtained by providing a portion of the descriptive information to a search engine;
- A third party commercial website, such as websites enabling the viewer 30 to effect an e-commerce transaction, in which case the online content available for retrieval can comprise content targeted by the e-commerce website to viewers of the particular television program. For example, a national chain of restaurants may wish to make a special promotional offering to viewers at the start (or during an intermission) of a broadcast of a specific sporting event (e.g., the Super Bowl). In another example, a shoe store may wish to offer promotions for its products to viewers of the show Sex and the City. This would enable viewers to purchase a product currently shown or advertised in current programming as it is aired. The address of the third party commercial website can be known a priori based on the descriptive information associated with the particular television program, or it can be obtained by providing a portion of the descriptive information to a search engine;
- A user-generated content (UGC) information server, in which case the online content available for retrieval can comprise UGC such as blogs, reviews, shrines and the like pertaining to the particular television program or participants having a role in the particular television program. The address of the UGC website can be known a priori based on the descriptive information associated with the particular television program, or it can be obtained by providing a portion of the descriptive information to a search engine;
- A social networking website with which the viewer has an account, and whose address can be known a priori based on information about the viewer. The viewer is assumed to have developed, through his or her account with the social networking website, a personal social network, and may have joined a certain number of common interest groups. Under such circumstances:
  - In a first example, the online content available for retrieval can comprise a listing of those members of the viewer's personal social network who are currently watching the same television program as the viewer (or who are currently watching a television program featuring one of the actors, players or teams, etc., that is featured in the television program currently being watched by the viewer, etc.). Identifying the members of the viewer's personal social network could be gained by the interactivity manager 54 supplying the viewer's account credentials (e.g., obtained from the viewer 30, from the particular customer or via a credentials database) to the social networking website, while knowledge of what those individuals are presently watching is available by accessing their respective accounts with the service provider (assuming they are properly identifiable);
  - In a second example, the online content available for retrieval can comprise content that is available exclusively to account holders who declare themselves to be members of a common interest group devoted to, for example, the particular television program, a particular actor, player or team, etc., featured in the particular television program, and so on;
  - In a third example, the online content available for retrieval can comprise a listing of those members of the viewer's personal social network who are currently online and have a declared interest in the television program being watched by the viewer (or who have a declared interested in one of the actors, players or teams, etc., that is featured in the television program currently being watched by the viewer, etc.). Identifying the appropriate online members of the viewer's personal social network (as well as their declared interests) could be gained by the interactivity manager 54 supplying the viewer's account credentials (e.g., obtained from the viewer 30, from the particular customer or via a credentials database) to the social networking website. This could then be a first step in setting up an eventual instant messaging, chat or SMS session between contacts/friends; etc.

While the above description has assumed that the interactivity manager 54 in the interactivity server 20 executes steps 210, 212 and 214 of the interactivity process, it should be appreciated that certain steps could be executed by other computing entities. For example, if the viewer 30 inputs the descriptive information elements 400 in the form of a search query, then steps 210, 214A, and 214B could actually be performed by the end user premise 12. Also, it should be appreciated that the parsing sub-step 214A and/or the retrieval sub-step 214B could be executed by one of the websites 112A, 112B, 112C under control of the end user premise 12 or the interactivity manager 54. Thus, more than one computing entity could participate in execution of the interactivity process.

The online content retrieved as a result of the retrieval sub-step 214B, namely the categorized online content 68, may be made up of any one or more of text, video, graphics, etc. for each category. Each such text, video, graphics, etc. can be accessed at a particular Internet address. It may thus be desirable, in an initial phase, to limit the display of the categorized content to just the Internet address (and possibly a short descriptor) of the content. Moreover, portions of the categorized online content 68 may be undesirable or inappropriate and requires filtering. Both the task of filtering the categorized online content 68 and organizing it in a suitable manner within the interactive viewing area 320 are functions of the formatting entity 56, which executes the formatting process that is now described in greater detail with reference to steps 220-222 of FIG. 2B.

Specifically, at step 220 of the formatting process, a filtering sub-process is performed on the managed content 74 and/or the categorized online content 68. This may result in selecting at least some of the categorized online content 68 and/or at least some of the managed content 74. In specific non-limiting examples, the filtering sub-process may include one or more of the following (which are mentioned in the context of the categorized online content 68 but could be applied equally in the context of the managed content 74):

Excluding portions of the categorized online content 68 containing obscene, illegal or other objectionable material (as measured by some standard, and possibly depending on parameters such as on ratings information about the television program);

Determining how the categorized online content 68 has been evaluated by a viewing community (e.g., by consulting the heuristics database 78) and choosing to retain portions of the categorized online content 68 that are above (or below) a certain approval level within the viewing community;

Comparing the categorized online content 68 relative to online content previously viewed by the viewer 30 (e.g., by consulting the heuristics database 78) and choosing to retain portions of the categorized online content 68 that are consistent with previously viewed online content for which the viewer 30 has expressed interest;

Comparing the categorized online content 68 relative to online content previously viewed by other viewers in the viewing community (e.g., by consulting the heuristics database 78) and choosing to retain portions of the categorized online content 68 that are consistent with previously viewed online content for which the viewing community has expressed interest;

Ranking the categorized online content 68 for viewability within the interactive viewing area 320 (e.g., by consulting the viewability database 96) and choosing to retain portions of the categorized online content 68 that have ranked highly in terms of viewability;

Estimating a potential interest of the online content to the viewer 30 (e.g., by consulting the demography database 44) and choosing to retain portions of the categorized online content 68 that are estimated to be of greatest potential interest to the viewer 30;

Assessing a commercial relevance of the categorized online content 68 to the particular customer (e.g., by consulting the marketing database 48) and choosing to retain portions of the online content that are assessed to be of greatest potential relevance to the particular customer;

Where the television program was previously recorded and is being played back at the current time and has reached a certain relative time of occurrence, excluding portions of the online content that are associated with relative times of occurrence that is after the certain relative time of occurrence. This can be done particularly conveniently for blogs and statistics which carry dates and times that can be referenced to the relative time of occurrence. Thus, the viewer's enjoyment of a previously recorded event is not spoiled by provision of interactive information that may include details of the outcome of a sporting event, the conclusion of a movie, etc.

It should be appreciated that the filtering sub-process could be executed on the differently for categorized online content 68 in different categories.

At step 222 of the formatting process, a presentation sub-process is performed on the portions of the managed content 74 and the categorized online content 68 that have survived the filtering sub-process, hereinafter referred to as "filtered managed content" 74A and "filtered categorized online content 68A". The presentation sub-process then configures the interactive viewing area 320 that appears on the screen 300 so as to convey the filtered managed content 74A and the filtered categorized online content 68A in an organized fashion. Specifically, configuring the interactive viewing area 320 can include (i) determining the shape and size of the interactive viewing area 320 relative to the TV viewing area 310 and/or (ii) internally dividing the interactive viewing area 320 into one or more segments.

The shape, size and internal layout of the interactive viewing area 320 can depend on the output capabilities (e.g., dimensions, resolution, etc.) of the television set 10. The output capabilities of the television set 10 can be obtained by interrogating the end user premise 12 or by observing data emitted by the television set.

In one specific non-limiting example, with reference to FIG. 3A, the interactivity area 320 includes a first graphical portion 302 (e.g. window) dedicated to the filtered managed content and a second graphical portion 304 (e.g. window) dedicated to the filtered categorized online content 68A. In another specific non-limiting example (not shown), the filtered managed content and the filtered categorized online content 68A is combinedly displayed within the interactivity area 320.

In accordance with a non-limiting embodiment, the filtered categorized online content 68A in different categories can be distinctly identified when presenting to the viewer 30.

In FIG. 3A, the window 304 dedicated to the filtered categorized online content 68A is separated into a plurality of regions 312A, 312B, 312C, one region for each of the categories. Hyperlinks in each category can be displayed within the corresponding region. For additional user convenience, the category associated with each region may be indicated in the vicinity of that region. Assume now that the interactivity manager 54 provides navigation functionality allowing the viewer 30 to select an individual graphical element in the interactivity area 320 and obtain further information in response thereto. By virtue of such navigation functionality, the viewer 30 can select a particular hyperlink in one of the regions 312A, 312B, 312C, which can cause a web page linked by the particular hyperlink to be displayed within the corresponding region of the window 304.

In another example (see FIG. 3B), the viewer 30 selects an active category via a tab 324 (in this case, category "A") and hyperlinks in the active category can be preferentially displayed in a main window 326, i.e., with greater prominence than the hyperlinks in other categories. For example, the hyperlinks in the other categories could be hidden from view (or grayed out), while tabs 322 to the other categories can be provided. By virtue of the navigation functionality of the interactivity manager 54, the viewer 30 can change active categories by selecting the tab corresponding to a different category. Also by virtue of the navigation functionality of the interactivity manager 54, the viewer 30 can select a particular hyperlink within the active category, which will cause a web page linked by the particular hyperlink to be displayed in the main window 320.

In yet another example (see FIG. 3C), the interactivity area 320 can be a full size window that presents the hyperlinks in different categories combined into a single listing of hyperlinks. Individual hyperlinks can be enhanced with an icon or mnemonic 332 indicative of the category to which that hyperlink belongs. By virtue of the navigation functionality of the interactivity manager 54, the viewer 30 can select a particular hyperlink, which will cause a web page linked by the particular hyperlink to be displayed in the window. Additional sorting functionality can be enabled (per-category, alphabetically, etc.).

The outcome of the presentation sub-process is release of the formatted interactive content 82, which may include formatted versions of the filtered categorized online content 68A and the filtered managed content 74A such that when this content is displayed on the viewer's screen, it will occupy the interactive viewing area 320 having a desired shape, size and internal layout. To this end, it may be beneficial for the formatting entity 56 to encode the desired shape, size and internal layout (and possibly other configuration parameters) of the interactive viewing area 320 for use by a downstream entity. The interactive viewing area configuration parameters can be sent to the downstream entity as part of the formatted interactive content 82 or as a separate stream altogether.

For example, in the arrangement of FIG. 1A, the formatted interactive content 82 and the interactive viewing area configuration parameters are sent along the interactive channel 22 to the interface 14. The formatted interactive content 82 and the interactive viewing area configuration parameters arrive at the interface 14, where the formatted interactive content 82 undergoes blending with one or more selected channel(s) from the multi-channel television programming 84 to create the aforementioned composite television signal for presentation to the viewer 30 over the at least one output device 24. Such blending takes into consideration the interactive viewing area configuration parameters in order to ensure that the interactive viewing area 320 will have the desired size, shape and internal layout. Accordingly, the interface may apply known processing techniques such as picture-in-picture, squeezeback, overlay, side-by-side, etc.

In the arrangement of FIG. 1B, the formatted interactive content 82 and the interactive viewing area configuration parameters are processed by the blending function 106 of the interface 52B, which also receives the selected television data stream 104 from the television distribution system 16B. The interactive viewing area configuration parameters advise the blending function 106 as to the desired size, shape and internal layout of the interactive viewing area 320. The blending function 106 then performs a blending step 230, which results in the creation of the composite television signal 108 that is encoded by the interface 52B and sent downstream to the end user premise 12 over the communication channel 100.

In yet another arrangement (not shown), the viewer 30 utilizes a primary device (such as a television equipped with a set top box or cable modem, or a computer) to view television programs from the television distribution system 16B and also utilizes a secondary device (such as a mobile phone or a computer) to receive interactive content. A first communication channel for conveying the request for interactivity 202 can be established between the primary device and the interactivity server 20. A second communication channel for receiving the formatted interactive content 82 (and sending navigation commands—see later) can be established between the secondary device and the interactivity server 20. Specifically, the formatted interactive content 82 and the interactive viewing area configuration parameters are sent by the interactivity server 20 over the second communication channel and are processed by an interface (not shown) of the secondary device used by the viewer 30. The interactive viewing area configuration parameters advise the interface of the secondary device as to the desired size, shape and internal layout of the interactive viewing area 320. It should also be appreciated that the secondary device may access the formatted interactive content 82 on a deferred basis, particularly if the formatted interactive content 82 is sent in the form of an email message to an email account associated with the viewer. In such an embodiment, a single device (e.g., a computer) could act as both the primary device and the secondary device.

It should be appreciated that in certain non-limiting embodiments, a dialogue may be established between the interface 14 and the interface 52 (or between the interface 14B and the interface 52B) in order to negotiate an optimal layout for the TV viewing area 310 and the interactive viewing area 320. In yet other embodiments, the TV viewing area 310 and the interactive viewing area 320 may intersect, e.g., one may be partly overlaid onto the other in the portion of the screen 300. In still other embodiments, the TV viewing area 310 can be omitted and the interactive viewing area 320 can take over the entirety of the screen 300.

It is also contemplated that the viewer 30 may be permitted to navigate through the interactive viewing area 320 using the at least one input device 26. Specifically, with reference to FIG. 1A, there is provided a navigation module 92, which can be located at the interactivity server 20 as, for example, a component subtending to the interactivity manager 54, but can also be distributed so as to include a portion at the end user premise 12. The navigation module 92 is operative to register commands issued by the viewer 30 when passing over a specific point or area within the screen 300. For example, in the case where the end user premise 12 includes a personal computer, movement of a mouse (which is an example of the at least one input device 26) can be tracked by the navigation module 92 based on the monitoring of upstream data that reaches the interactivity manager 54 after having travelled across the interactive channel 22. When the mouse is clicked, this is interpreted as a command which can influence operation of the interactivity manager 54 and the formatting entity 56, as is now described.

For example, consider the case where the formatted interactive content 82 displayed in the interactive viewing area 320 includes a list of actionable links to a set of websites. When the viewer 30 points the mouse to a particular link and clicks, the precise positioning of the mouse, as well as the act of clicking, can be registered by the navigation module 92. The navigation module 92 then causes the interactivity manager 54 to retrieve online content available at the address associated with the particular link that was clicked by the viewer 30. In addition, the navigation module 92 cooperates with the formatting entity 56 so as to cause the newly retrieved online content to appear within the interactive viewing area 320, for example in a new window or to replace an existing portion of the interactive viewing area 320.

Other navigation commands can include altering the size, shape or configuration of the interactive viewing area 320 and/or the TV viewing area 310, as well as activation of various menus (e.g., by right clicking and left clicking), accessing features through the use of dedicated buttons or combinations of buttons, and so on. Of course, the above examples refer to a mouse but this is merely one example of the at least one input device 26, and it will be appreciated that other input devices (such as a remote control, touch surface, game controller, voice system, etc.) can be used to effect the requisite selections and convey the requisite viewer input.

It should also be appreciated that although the navigation module 92 was described with reference to the arrangement of FIG. 1A, the same navigation module could be used in the arrangement of FIG. 1B.

It should also be appreciated that certain portions of the interactivity server 20, in particular the interactivity manager 54 and/or the formatting entity 56, may be located at the end user premise 12 and integrated with the equipment thereat, such as a set top box, cable modem or computing device.

Certain adaptations and modifications of the described embodiments can be made. Therefore, the above discussed embodiments are considered to be illustrative and not restrictive.

What is claimed is:

1. A method executable by at least one computing entity, comprising:
   displaying a television program provided from a first source to a user on a screen;
   responsive to a request for interactivity from the user during display of the television program, obtaining a first portion of a plurality of descriptive information elements associated with the television program, from a second source, and also obtaining a second portion of the plurality of descriptive information elements from the request for interactivity, the second source being different from the first source, the second portion of the plurality of descriptive information elements comprising a user input included with the request for interactivity as a search query of the user;
   during display of the television program from the first source, parsing the plurality of descriptive information elements obtained from the second source and from the request for interactivity into one or more subsets of information elements associated with one or more information categories, each of the information categories defining categories of supplemental information related to content of the television program;
   based on the parsing of the plurality of descriptive information elements obtained from the second source and from the request for interactivity, retrieving online content via an Internet for each of the one or more information categories by conducting a separate online retrieval effort at a separate Internet address for each particular one of the information categories; and
   causing the retrieved online content to be presented to the user in an interactive viewing area on the screen during display of the television program in a content viewing area on the screen, wherein the interactive viewing area is configurable to include a plurality of windows, each window includes a tab associated with the corresponding information category, an active category among the information categories is selectable via a tab, the plurality of windows are overlappingly presented such that the tabs of the windows and content presented in one of the windows for the active category are accessible while content in the other windows are hidden.

2. The method defined in claim 1, further comprising identifying the information categories into which the at least some of the descriptive information elements are to be parsed.

3. The method defined in claim 2, wherein the identifying the information categories is carried out based on at least one of the descriptive information elements.

4. The method defined in claim 3, wherein the at least one of the descriptive information elements indicates a type of television program being displayed to the user, wherein the categories are a function of the type of television program.

5. The method defined in claim 1, further comprising interacting with the user through a graphical user interface window to obtain the search query.

6. The method defined in claim 1, wherein the at least some of the plurality of descriptive information elements include descriptive information elements pertaining to the television program being conveyed to the user.

7. The method defined in claim 6, wherein the descriptive information elements pertaining to the television program are derived from the request for interactivity issued by end user equipment during viewing of the television program.

8. The method defined in claim 7, wherein the descriptive information elements pertaining to the television program include information derived from a scheduling database in response to receipt of the request for interactivity issued by end user equipment during viewing of the television program.

9. The method defined in claim 1, wherein said parsing comprises, for at least a first information category: comparing each particular one of the at least some of the plurality of descriptive information elements to potential information elements associated with the first information category and, if there is a match, including the particular descriptive information element in the subset of information elements associated with the first information category.

10. The method defined in claim 1, wherein said parsing comprises, for each particular one of the information categories:
   comparing each particular one of the at least some of the plurality of descriptive information elements to potential information elements associated with the particular information category and, if there is a match, including the particular descriptive information element in the subset of information elements associated with the particular information category.

11. The method defined in claim 1, wherein certain ones of the at least some of the plurality of descriptive information elements are accompanied by a respective category indicator associated with a respective one of the categories, and wherein said parsing comprises, for each particular one of the certain ones of the at least some of the plurality of descriptive information elements: including the particular descriptive information element in the subset of information elements associated with the information category associated with the respective category indicator that accompanies the particular descriptive information element.

12. The method defined in claim 1, wherein the retrieval effort for a particular information category comprises conducting a search based on the information elements in the subset of information elements associated with the particular information category.

13. The method defined in claim 12, wherein each separate online retrieval effort is carried out sequentially.

14. The method defined in claim 13, wherein at least one of the online retrieval efforts comprises a search carried out by an Internet search engine.

15. The method defined in claim 12, wherein at least two of the online retrieval efforts are carried out in parallel.

16. The method defined in claim 15, wherein at least one of the online retrieval efforts comprises a search carried out by an Internet search engine.

17. The method defined in claim 1, further comprising combining the online content retrieved for distinct information categories into a single listing of online content presented to the user.

18. The method defined in claim 1, wherein causing the retrieved online content to be presented to the user comprises distinctly identifying the online content retrieved on a per category basis.

19. The method defined in claim 1, wherein causing the retrieved online content to be presented to the user comprises managing a browser-type interface through which the retrieved online content is graphically displayed.

20. The method defined in claim 1, further comprising interacting with the user to obtain a selection of an active information category from among the information categories, wherein causing the retrieved online content to be presented to the user comprises causing the online content in the active information category to be displayed with greater prominence than the online content in any other one of the information categories.

21. The method defined in claim 1, wherein the content in the one of the windows for the active category comprises one or more hyperlinks, the one or more hyperlinks being displayed and accessible.

22. The method defined in claim 1, wherein the parsing and retrieving are carried out by a single computing entity used by the user.

23. The method defined in claim 1, wherein the obtaining is carried out by a first computing entity and wherein the retrieving is carried out by a second computing entity connected to the first computing entity over the Internet.

24. The method defined in claim 23, wherein the parsing is carried out by the first computing entity.

25. The method defined in claim 23, wherein the parsing is carried out by the second computing entity.

26. The method defined in claim 1, wherein at least one of the descriptive information elements is parsed into more than one of the subsets of information elements.

27. The method defined in claim 1, wherein each of the descriptive information elements is parsed into no more than one of the subsets of information elements.

28. The method defined in claim 1, further comprising:
formatting the online content for delivery to the viewer.

29. A non-transitory computer-readable storage medium comprising a set of instructions for execution by a computing device, wherein execution of the set of instructions by the computing device causes the computing device to execute a method that includes:
displaying a television program provided from a first source to a user on a screen;
responsive to a request for interactivity from the user during display of the television program, obtaining a first portion of a plurality of descriptive information elements associated with the television program, from a second source, and also obtaining a second portion of the plurality of descriptive information elements from the request for interactivity, the second source being different from the first source, the second portion of the plurality of descriptive information elements comprising a user input included with the request for interactivity as a search query of the user;
during display of the television program from the first source, parsing the plurality of descriptive information elements obtained from the second source and from the request for interactivity into one or more subsets of information elements associated with one or more information categories, each of the information categories defining categories of supplemental information related to content of the television program;
based on the parsing of the plurality of descriptive information elements obtained from the second source and from the request for interactivity, retrieving online content via an Internet for each of the one or more information categories by conducting a separate online retrieval effort at a separate Internet address for each particular one of the information categories; and
causing the retrieved online content to be presented to the user in an interactive viewing area on the screen during display of the television program in a content viewing area on the screen, wherein the interactive viewing area is configurable to include a plurality of windows, each window includes a tab associated with the corresponding information category, an active category among the information categories is selectable via a tab, the plurality of windows are overlappingly presented such that the tabs of the windows and content presented in one of the windows for the active category are accessible while content in the other windows are hidden.

30. The non-transitory computer-readable storage medium as defined in claim 29, wherein the method further comprises:
formatting the online content for delivery to the viewer over the communication channel.

31. The non-transitory computer-readable storage medium defined in claim 29, wherein the content in the one of the windows for the active category comprises one or more hyperlinks, the one or more hyperlinks being displayed and accessible.

32. A method executable by a computing device, comprising:
conveying a media element provided from a first source to a user;
responsive to a request for interactivity from the user during display of the media element, obtaining a first portion of descriptive information associated with the media element from a second source, and also obtaining a second portion of the descriptive information from the request for interactivity, the second source being different from the first source, the second portion of the descriptive information comprising a user input included with the request for interactivity as a search query from the user;

during display of the media element from the first source, parsing the descriptive information obtained from the second source and from the request for interactivity into one or more categorized information subsets associated with respective content groups, each of the categorized information subsets defining categories of supplemental information related to content of the media element;

based on the parsing of the descriptive information obtained from the second source and from the request for interactivity, retrieving online content via an Internet for each of the one of the one or more categorized information subsets by conducting a separate online retrieval effort at a separate Internet address for each particular one of the information categories; and causing the retrieved online content to be presented to the user in an interactive viewing area on the screen concurrent with the conveying of the media element in a content viewing area on the screen, wherein the interactive viewing area is configurable to include a plurality of windows, each window includes a tab associated with the corresponding information category, an active category among the information categories is selectable via a tab, the plurality of windows are overlappingly presented such that the tabs of the windows and content presented in one of the windows for the active category are accessible while content in the other windows are hidden.

33. The method defined in claim 32, wherein the content in the one of the windows for the active category comprises one or more hyperlinks, the one or more hyperlinks being displayed and accessible.

34. The method defined in claim 32, wherein causing the online content for each of the content groups to be presented to a user comprises:
  causing the online content pertaining to a particular one or more of the content groups to be preferentially presented to a user; and
  interacting with the user to allow selection by the user of the particular one or more of the content groups.

35. The method defined in claim 32, wherein the media element comprises one or more of a television show, a website, a picture, a movie, a video segment and an audio segment.

36. A non-transitory computer-readable storage medium comprising a set of instructions for execution by a computing device, wherein execution of the set of instructions by the computing device causes the computing device to execute a method that includes:
  conveying a media element to a user from a first source;
  responsive to a request for interactivity from the user during display of the media element, obtaining a first portion of descriptive information associated with the media element from a second source, and also obtaining a second portion of descriptive information from the request for interactivity, the second source being different from the first source, the second portion of the descriptive information comprising a user input included with the request for interactivity as a search query from the user;
  during display of the media element from the first source, parsing the descriptive information obtained from the second source and from the request for interactivity into one or more categorized information subsets associated with respective content groups, each of the categorized information subsets defining categories of supplemental information related to content of the media element;
  based on the parsing of the descriptive information obtained from the second source and from the request for interactivity, retrieving online content via an Internet for each of the one or more categorized information subsets by conducting a separate online retrieval effort at a separate Internet address for each particular one of the information categories; and
  causing the retrieved online content to be presented to the user in an interactive viewing area on the screen concurrent with the conveying of the media element in a content viewing area on the screen, wherein the interactive viewing area is configurable to include a plurality of windows, each window includes a tab associated with the corresponding information category, an active category among the information categories is selectable via a tab, the plurality of windows are overlappingly presented such that the tabs of the windows and content presented in one of the windows for the active category are accessible while content in the other windows are hidden.

37. The non-transitory computer-readable storage medium defined in claim 36, wherein the content in the one of the windows for the active category comprises one or more hyperlinks, the one or more hyperlinks being displayed and accessible.

38. Apparatus for delivering interactivity to viewers of television programs, comprising:
  an interface configured to receive a request for interactivity from a viewer of a television program provided from a first source;
  an interactivity manager configured to:
    responsive to the request for interactivity, obtain a first portion of descriptive information associated with the television program from a second source and also obtain a second portion of the descriptive information from the request for interactivity, to parse the descriptive information into subsets associated with respective categories, the second source being different from the first source, the second portion of the descriptive information comprising a user input included with the request for interactivity as a search query of the user, one or more of the categories being assigned to the user input, each of the respective categories defining categories of supplemental information related to content of the television program:
    based on the parsing of the descriptive information obtained from the second source and from the request for interactivity, retrieve categorized online content via an Internet for each of the one or more information categories by conducting a separate online retrieval effort at a separate Internet address for each particular one of the information categories; and
    cause the retrieved online content to be presented to the user in an interactive viewing area on the screen during display of the television program in a content viewing area on the screen, wherein the interactive viewing area is configurable to include a plurality of windows, each window includes a tab associated with the corresponding information category, an active category among the information categories is selectable via a tab, the plurality of windows are overlappingly presented such that the tabs of the windows and content presented in one of the windows for the active category are accessible while content in the other windows are hidden.

* * * * *